Feb. 27, 1962     D. SAMIRAN     3,022,699
QUICK ACTING BOLT HAVING RADIALLY
CONTRACTABLE THREAD THEREON
Filed July 24, 1956     2 Sheets-Sheet 1
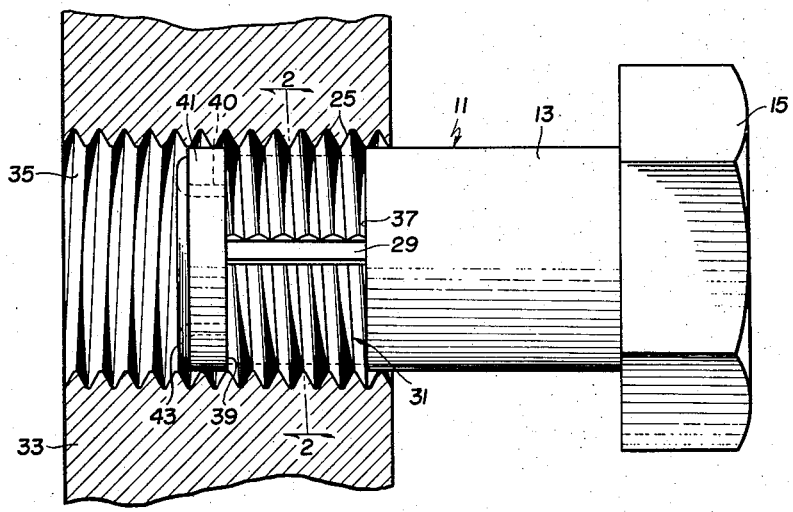
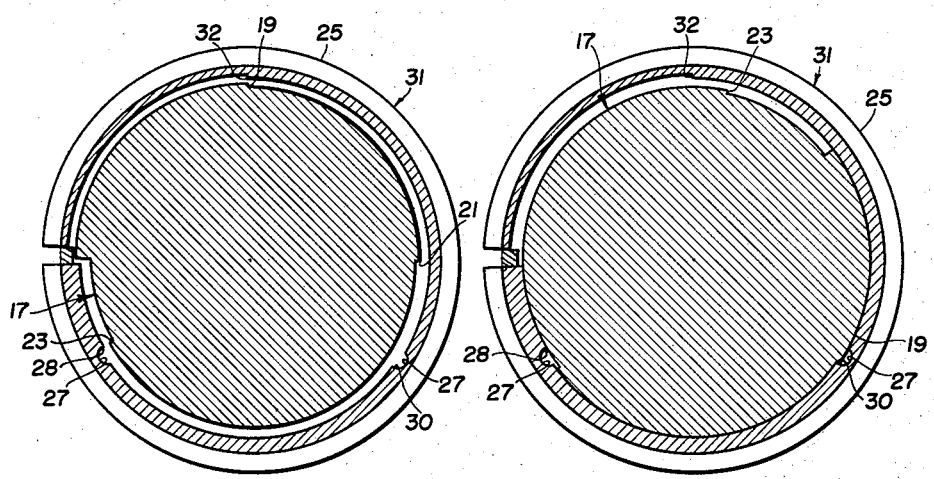
INVENTOR.
DAVID SAMIRAN
BY *Albert L. Jeffers*
ATTORNEY INVENTOR.
DAVID SAMIRAN
BY
Albert L. Jeffers
ATTORNEY

United States Patent Office 3,022,699
Patented Feb. 27, 1962

3,022,699
QUICK ACTING BOLT HAVING RADIALLY
CONTRACTABLE THREAD THEREON
David Samiran, 2126 Fairhill Road, Suite 18,
Cleveland 6, Ohio
Filed July 24, 1956, Ser. No. 599,858
3 Claims. (Cl. 85—1)

This invention relates to a quick locking bolt and more particularly to a bolt which can be inserted into a female member and locked therein by less than one turn or revolution of the bolt.

A salient object of the invention is to provide a quick locking bolt having means for moving or drawing the bolt axially when the bolt is rotated in the female member.

An important object of the invention is to provide a quick acting lock connection on a male bolt which will lock the bolt in a female member in an expedient manner.

A further object of the invention is to provide a quick locking bolt having an expandable member which will serve as the threaded portion of the bolt and when expanded will lock the bolt in a female member.

Another object of the invention is to provide a bolt having a continuous threaded ring which is adapted to be offset when inserted in a female member to prevent axial movement due to vibration.

A still further object of the invention is the provision of means for rotating the threaded ring when in the offset position.

Another object of the invention is to provide a bolt which will not be unthreaded or become loose due to vibrations.

With the foregoing objects in view, together with such other objects and advantages as may subsequently appear, the invention resides in the parts and in the combination, construction and arrangement of parts hereinafter described and claimed, and illustrated by way of example in the accompanying drawing, in which FIGURE 1 is a longitudinal elevation, partly in section, showing the quick locking bolt disposed in a female member;

FIGURE 2 is a cross sectional view taken substantially on line 2—2 in FIGURE 1 with the expandable member in the locked position;

FIGURE 3 is a view similar to FIGURE 2 with the expandable member in the unlocked position;

Figure 4:
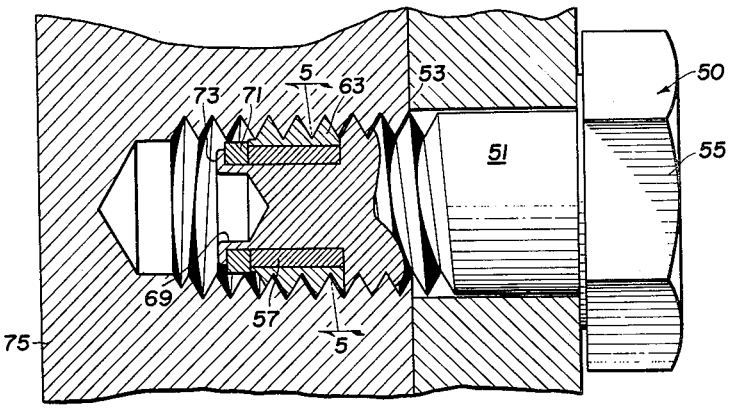
FIGURE 4 is a longitudinal elevation, partly in section, showing a modification of the invention.

Referring to the drawing and more particularly to FIGURE 1, the numeral 11 designates a male member of a quick locking bolt having a body portion 13 with a conventional hex head 15 at one end. The head may be provided with a groove (not shown) for receiving a tool such as a screw driver if desired.

The body is provided with an annular cam portion 17 adjacent the other end and is adapted to rise 360 degrees through a number of circumferentially arranged portions, the radii of the portions decreasing circumferentially with substantially radial shoulders 19, 21 and 23, respectively. The cam rise in each circumferentially arranged portion is not critical and may be any reasonable number of degrees.

The numeral 25 designates a split, thread ring provided with a number of weakening grooves 27 and is constructed with a larger thickness or width at one end which becomes gradually smaller toward the other end with a number of similar circumferentially arranged portions 28, 30 and 32 on the inner periphery to correspond with circumferentially arranged portions on the cam portion. A number of split rings 25 are assembled and held together by a key 29 to form an contractable member 31 which is mounted on the cam portion. The outer periphery of the rings which form the threads are rounded to prevent stripping or shaving as they are inserted into a female member 33 having a threaded portion 35.

The body 13 is provided with annular shoulders 37 and 39 and terminates in a cylinder 40 for receiving a retaining washer 41 which is permanently held thereon by spinning the end of the cylinder as illustrated at 43.

It will be observed that in the operation of the quick acting or locking bolt shown in FIGURES 1 to 3 the threaded portion 31, which is slightly undersized, is inserted straight or axially into the thread portion of the female member 33 without rotating the body. Although the threaded portion 31 is slightly undersized, it will be in frictional contact with the female member 33 as shown in FIGURE 1. The bolt is then rotated a few degrees whereby the cam portion 17 will engage the contractable member 31 forcing the rounded threads into the threads of the female member locking the bolt therein. As illustrated in FIGURE 2, the portion 19 of the cam portion will bypass the first portion 32 of the contractable member 31 when rotated and will engage the next portion 30 to move or draw the body 13 axially into the female member 33. The number of circumferentially arranged portions are provided to compensate for manufacturing tolerance. It is to be understood that the bolt will be drawn axially into the female member regardless of which point the circumferentially arranged portions become engaged. It should be noted that when one of the circumferentially arranged portions of the cam portion 17 contacts one of the circumferentially arranged portions of the contractable member 31, the cam will no longer expand the contractable member, thus allowing the member to be drawn axially into the female member by applying pressure to the hex head 55.

To remove the bolt, the body 13 is rotated to substantially the zero rise position whereby the contractable member 31 may be compressed, which allows the bolt to slide out by applying a little tension or pull.

Referring to FIGURES 4 to 7, the number 51 designates a male member of a bolt 50 having a conventional threaded portion 53 and a hex head 55. The male member is provided with an annular cam portion 57 adjacent the free end and is adapted to rise 360 degrees through a number of circumferentially arranged portions 59 and 61, respectively.

The numeral 63 designates a continuous threaded ring member having a section with a larger thickness or width which becomes progressively smaller through 360 degrees. The ring member is provided with circumferentially arranged portions 65 and 67 on the inner periphery to correspond with the circumferentially arranged portions 59 and 61. If desired, the portions may be formed at an angle so that when the parts are engaged there is less tendency of separation or by-passing due to manufacturing tolerance. The free end of the member 51 is provided with a hollow or cylinder portion 69 for receiving a retaining washer 71 which is secured thereon by spinning the end of the cylinder as illustrated at 73.

Figure 6:
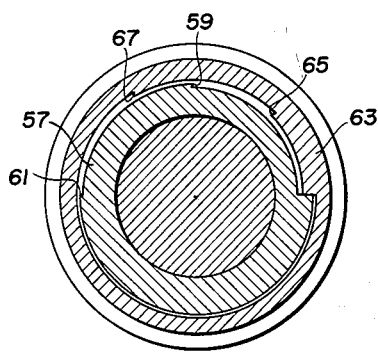
FIGURE 6 is a cross sectional view showing the threaded ring and cam in the zero position.
Figure 5:
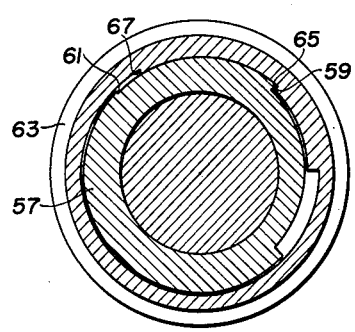
FIGURE 5 is a cross sectional view taken substantially on line 5—5 in FIGURE 4.

It will be observed that in the operation of the bolt shown in FIGURES 4 to 6 the male member 53 and the threaded continuous ring portion may be inserted into a threaded female portion 75 by the same procedure as a conventional bolt. As the hex head 55 is rotated, the cam actuates the threaded ring portion to a slightly off-center position which forces a portion of the threads into tighter engagement with the female threads. As illustrated in FIGURES 5 and 6, the portion 59 of the cam portion will engage the portion 65 of the ring as the bolt is rotated axially into the female member 75. It should be noted that as the bolt is inserted into the female member the threads on the member 51 and ring 63 have the same pitch.

When the hex head 55 is rotated to remove the bolt, the cam will have a tendency to change the pitch diameter, whereby the bolt requires somewhat more pressure or torque to be removed. It is obvious that due to the novel construction of the bolt vibration will not cause the bolt to loosen or become unthreaded.

Figure 7:
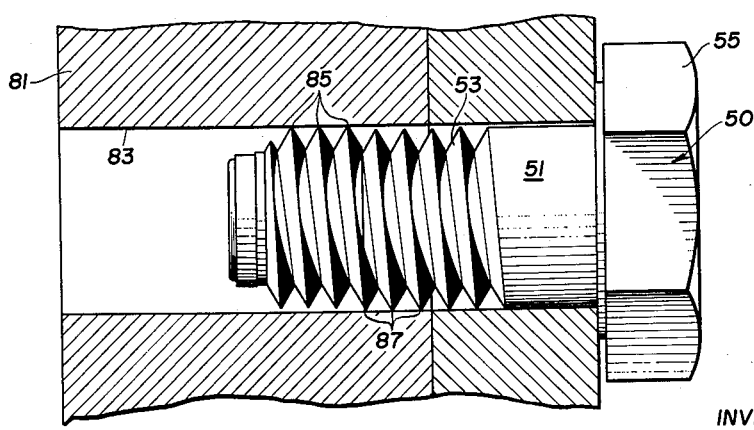
FIGURE 7 is a view similar to FIGURE 4 showing the bolt in an unthreaded female member.

As shown in FIGURE 7, the bolt 50 may be inserted into a female member 81 having a bore 83 which is slightly larger in diameter than the threaded portion. The bolt with the cam in the zero position is inserted straight into the bore. When the bolt is rotated a few degrees, the cam will engage the ring to move it off center and will force the threads into contact at points 85 with the bore. The threads of the member 51 will be forced into contact at points 87, thus locking the bolt in the female member. It is obvious that if the metal of the female member is relatively soft the threads will function similar to sheet metal screws in that they are self threading. To remove the bolt, the head 55 is rotated a few degrees to place the cam in the zero rise position which permits the bolt to assume its normal size and can be removed by applying a little tension or pull.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and the scope of the appended claims.

I claim:

1. A quick acting bolt comprising, in combination, a body portion having an annular cam portion adjacent one end, said cam portion having a number of circumferentially arranged portions, the radii of said portions decreasing circumferentially with substantially radial shoulders therebetween, a contractable member having a threaded portion on its outer periphery and adapted to be mounted on the cam portion, said contractable member provided with a similar number of circumferentially arranged portions, the radii of said portions increasing circumferentially with substantially radial shoulders therebetween, said contractable member being normally biased to a size to frictionally engage a cooperating internally threaded member and the normal radii of said portions of said contractable member being larger than the corresponding portions of said cam portion by amounts permitting said contractable member to be contracted on said cam portion to have a maximum diameter less than the minimum diameter of the cooperating threaded member and for non-corresponding portions of said cam and said contractable member to engage when relatively rotated in the direction of advance of the threads to prevent contraction of said contractable member whereby one of the radial shoulders of the circumferentially arranged portions will contact one of the radial shoulders of the contractable member when rotated to move the body axially.

2. A quick acting bolt comprising, in combination, a body portion and an annular cam portion having a number of circumferentially arranged portions, the radii of said portions decreasing circumferentially with substantially radial shoulders therebetween, a contractable member having threads on the outer periphery, said contractable member adapted to be mounted on the cam portion, said contractable member provided with similar circumferentially arranged portions, the radii of said portions increasing circumferentially with substantially radial shoulders therebetween, said contractable member being normally biased to a size to frictionally engage a cooperating internally threaded member and the normal radii of said portions of said contractable member being larger than the corresponding portions of said cam portion by amounts permitting said contractable member to be contracted on said cam portion to have a maximum diameter less than the minimum diameter of the cooperating threaded member and for non-corresponding portions of said cam and said contractable member to engage when relatively rotated in the direction of advance of the threads to prevent contraction of said contractable member, said annular cam adapted to move the contractable member radially and axially when the body portion is rotated.

3. A quick acting bolt comprising, in combination, a longitudinal body having a head portion at one end and an annular cam portion adjacent the other, said cam portion having a number of circumferentially arranged portions, the radii of said portions decreasing circumferentially with substantially radial shoulders therebetween, a split radial contractable member mounted on the cam portion forming a threaded portion, said contractable member having a number of similar circumferentially arranged portions, the radii of said portions increasing circumferentially with substantially radial shoulders therebetween, said contractable member being normally biased to a size to frictionally engage a cooperating internally threaded member and the normal radii of said portions of said contractable member being larger than the corresponding portions of said cam portion by amounts permitting said contractable member to be contracted on said cam portion to have a maximum diameter less than the minimum diameter of the cooperating threaded member and for non-corresponding portions of said cam and said contractable member to engage when relatively rotated in the direction of advance of the threads to prevent contraction of said contractable member, said annular cam portions adapted to expand the contractable member radially and move the body portion axially when the bolt is rotated.

References Cited in the file of this patent

UNITED STATES PATENTS

| | | |
|---|---|---|
| 987,106 | Blanton | Mar. 21, 1911 |
| 1,811,200 | Kainer | June 23, 1931 |
| 2,367,213 | Harding | Jan. 16, 1945 |
| 2,644,524 | Baker | July 7, 1953 |

FOREIGN PATENTS

| | | |
|---|---|---|
| 265,608 | Switzerland | Mar. 1, 1950 |